(12) United States Patent
Venkatasubramanian et al.

(10) Patent No.: US 10,983,963 B1
(45) Date of Patent: Apr. 20, 2021

(54) AUTOMATED DISCOVERY, PROFILING, AND MANAGEMENT OF DATA ASSETS ACROSS DISTRIBUTED FILE SYSTEMS THROUGH MACHINE LEARNING

(71) Applicant: Hortonworks Inc., Santa Clara, CA (US)

(72) Inventors: Srikanth Venkatasubramanian, Sunnyvale, CA (US); Babu Prakash Rao, Bangalore (IN); Hemanth Yamijala, Bangalore (IN); Rohit Choudhary, Bangalore (IN); Raghumitra Kandikonda, Bangalore (IN)

(73) Assignee: Cloudera, Inc., Palo Alto, CA (US)

( * ) Notice: Subject to any disclaimer, the term of this patent is extended or adjusted under 35 U.S.C. 154(b) by 144 days.

(21) Appl. No.: 16/140,453

(22) Filed: Sep. 24, 2018

Related U.S. Application Data

(60) Provisional application No. 62/562,635, filed on Sep. 25, 2017.

(51) Int. Cl.
| | | |
|---|---|---|
| *G06F 16/18* | (2019.01) | |
| *G06F 16/182* | (2019.01) | |
| *G06F 9/38* | (2018.01) | |
| *G06F 16/28* | (2019.01) | |
| *G06F 16/23* | (2019.01) | |
| *G06F 9/48* | (2006.01) | |
| *G06F 16/25* | (2019.01) | |
| *G06F 16/26* | (2019.01) | |
| *G06F 17/18* | (2006.01) | |

(52) U.S. Cl.
CPC .......... *G06F 16/182* (2019.01); *G06F 9/3891* (2013.01); *G06F 9/4887* (2013.01); *G06F 16/2358* (2019.01); *G06F 16/254* (2019.01); *G06F 16/26* (2019.01); *G06F 16/285* (2019.01); *G06F 17/18* (2013.01)

(58) Field of Classification Search
CPC ....... G06F 16/182; G06F 16/285; G06F 16/26
See application file for complete search history.

(56) References Cited

U.S. PATENT DOCUMENTS

2016/0092497 A1* 3/2016 Oberhofer ........... G06F 16/2365
707/693
2017/0004185 A1* 1/2017 Zhu ..................... G06F 3/04842

\* cited by examiner

*Primary Examiner* — Loc Tran
(74) *Attorney, Agent, or Firm* — Staniford Tomita LLP

(57) ABSTRACT

Embodiments for locating, identifying and categorizing data-assets through advanced machine learning algorithms implemented by profiler components across Hadoop and Hadoop Compatible File Systems, databases and in-memory objects automatically and periodically to provide a visual representation of the category of data infrastructure distributed across data-centers and multiple clusters, for the purposes of enriching data quality, enabling data discovery and improving outcomes from downstream systems.

15 Claims, 13 Drawing Sheets

AUTOMATED DISCOVERY, PROFILING, AND MANAGEMENT OF DATA ASSETS ACROSS DISTRIBUTED FILE SYSTEMS THROUGH MACHINE LEARNING

CROSS-REFERENCE TO RELATED APPLICATIONS

The present application claims priority to U.S. Provisional Application No. 62/562,635, filed on Sep. 25, 2017 and entitled "Secure Service Deployment, Extensible Management, and Management of Data Assets in Hadoop Multi-Cluster Environments."

TECHNICAL FIELD

Embodiments are generally directed to managing data assets, and more specifically to locating, identifying, and categorizing data through advanced machine learning algorithms.

BACKGROUND

Enterprises are facing critical challenges in managing the vast amounts of data they generate, store, and process. The data is often housed in different data centers and cloud locations, and is thus spread widely across many clusters and repositories in hybrid storage systems. Knowing what data the company has and where it is located is becoming a critical and increasingly difficult challenge. Data stewards face the challenge of managing data assets due to the fact that there is no uniform way of identifying the behavior of users, the usage density, the sensitivity of assets under management, and the quality of the data. Such tasks are arduous and tend to lack complete coverage given the nature of data ingestion in a cluster for arbitrary data that is generally without schema. Therefore, an automatic way of classifying data, metadata and content is necessary to manage present data volumes in enterprise applications.

Consistent data representation, such as representing data in terms of numerical and string values is advantageous and indeed critical in allowing users to write efficient queries without putting additional load or burdens in terms of compute utilization. However, data governance, security, and management in large data storage systems is a significant challenge for data-administrators in a single or multi-cluster environments. The capability to manage all data assets, clusters, and maintain access control across clusters is a much-needed feature when the size of data is growing exponentially with ever-increasing numbers of clusters and disparate storage locations.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
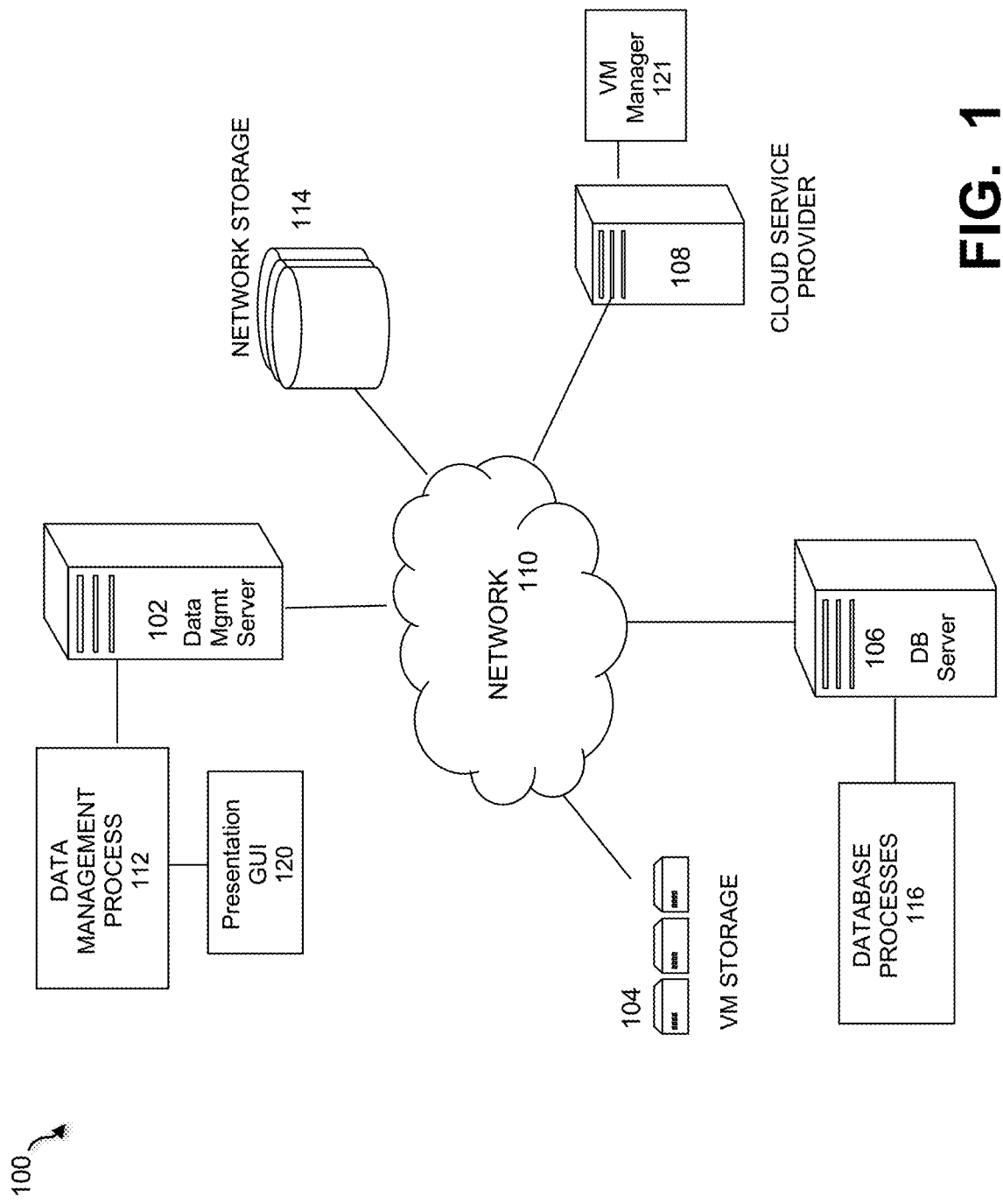
FIG. 1 illustrates a large-scale data processing and storage network implementing a data management process under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

FIG. 1 is a diagram of a large-scale data processing system including cloud and WAN/LAN networks implementing a data management process, under some embodiments. In system 100, a data management server 102 executes a data management process 112 that coordinates or manages the generation, storage, and management of data and associated metadata and content for various data sources 106 and 108 and storage devices, such as network storage 114, client storage 106, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114.

The network server computers are coupled directly or indirectly to the target VMs 104 and 106, and to the data source 108 through network 110, which is typically a cloud network, but may also be a LAN (local area network), WAN (wide area network), or other appropriate network. It may also be a composite network comprising private/public cloud and other local/wide area networks. Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. Various different applications, such as backup processes, data applications, and so on generate and store this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system, and the data may reside on one or more hard drives (e.g., 118) for the database(s) in a variety of formats.

As stated above, cloud network 110 may be a private network or it may be a public network provided by a third-party cloud service provider (CSP). In this case, at least part of the infrastructure of network 110, such as servers, routers, interfaces and so on are provided to users such as backup server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. The cloud provider 108 may be any company such as Amazon, EMC, Apple, Cisco, Citrix, IBM, Google, Microsoft, Salesforce.com, and so on.

Figure 2:
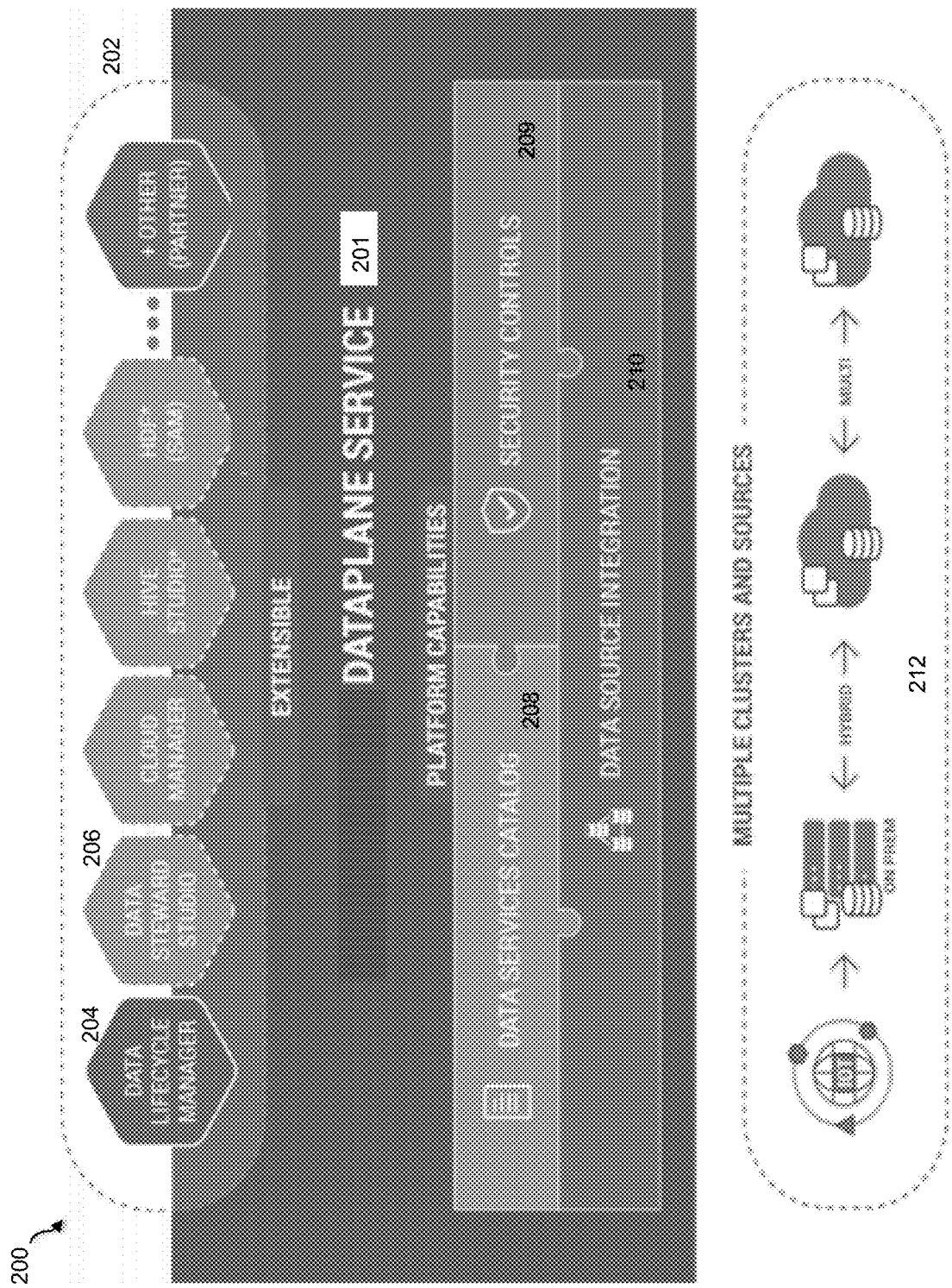
FIG. 2 illustrates a data platform in a multi-cluster environment that supports certain embodiments described herein.

System 100 may represent a large-scale or enterprise-scale system in which an organization executes various different data-driven technologies. A typical modern data architecture captures and processes huge amounts of data in real-time. Such data may be classified as "big data" and more commonly "data lakes." Embodiments of the data management process help facilitate the capture, storage and processing of large and growing amounts of data generated and ingested in the system. FIG. 2 illustrates a comprehensive data management platform referred to as a "dataplane" system that comprises a portfolio of data applications 202 that enable organizations to discover, manage, govern and optimize their data across hybrid environments. In an embodiment, the dataplane system 200 consists of a unified dataplane service 201 and an extensible set of applications 202, including: a data lifecycle manager 204, a data steward studio 206, and other applications including a streams messaging manager, and a data analytics studio. All of these applications operate on top of the service platform 201, which serves as a management layer across an organization's clusters 212, whether they are on-premises or in the cloud. The data lifecycle manager (DLM) 204 is a service that safeguards the organization's data by replicating it in on-premises data center(s) or in the cloud. The data steward studio (DSS) 206 enables the organization to discover, understand and govern its data across on-premises and cloud clusters. A data analytics studio (DAS) may be used to provide diagnostic tools and intelligent recommendations to business analysts and IT teams. A streams messaging manager may also be provided as a management and monitoring tool stream processing tools, such as Apache Kafka and similar products.

System 200 may provide access to a variety of different cluster services available to a user. Cluster services typically include programs or products that provide features such as: user authentication, data security, data validation, data processing, and so on. Cluster services include Apache Ranger for data security, Apache Atlas for metadata management and governance, Apache Hive for data processing and Apache Ambari for cluster management and configuration. Although specific Apache products are mentioned, embodiments are not so limited and any similar products or programs may be used to provide security, metadata management, data processing, cluster management, and any other relevant cluster services.

System 200 of FIG. 2 represents a new service to manage, govern and secure data and workloads across multiple sources (e.g., databases, enterprise data warehouses (EDWs), clusters, data lakes), types of data (e.g., at-rest or in-motion), and tiers of data (e.g., on-premises, multiple clouds, hybrid). The dataplane service 201 includes certain platform capability components such as a data services catalog 208 that is a catalog of available services and functionality to allow for new services to be created and extend the platform, where the services 202 include the data lifecycle manager and possible extensions from organization partners. Another component is the security controls 209, which is a persona-based controls mechanism that allows users (e.g., Hadoop operators, data stewards, business analysts, data scientists, etc.) to get the right access to the right information. A data source integration component 210 is a layer that allows data processing system (DPS) users to understand the data in external sources.

The data stored and processed by system 200 may comprise any relevant data of concern to companies, organizations, enterprises and so on, and may comprise highly sensitive or confidential information, such as financial information, medical information, personal identification information, trade secrets, confidential business or government information, and so on. Such data may comprise data assets that directly generate revenue or represent valuable or sensitive information. Such data may also be monitored, regulated, stored or otherwise processed by other entities and under certain rules and statutes, such as HIPAA (Health Insurance Portability and Accountability Act), GDPR (General Data Protection Regulation), privacy acts (e.g., California Consumer Privacy Act), and so on. Embodiments of the data management system allow data storage and processing systems to efficiently detect and classify (profile) such data across various clusters and data centers for appropriate downstream analysis and processing.

Figure 3:
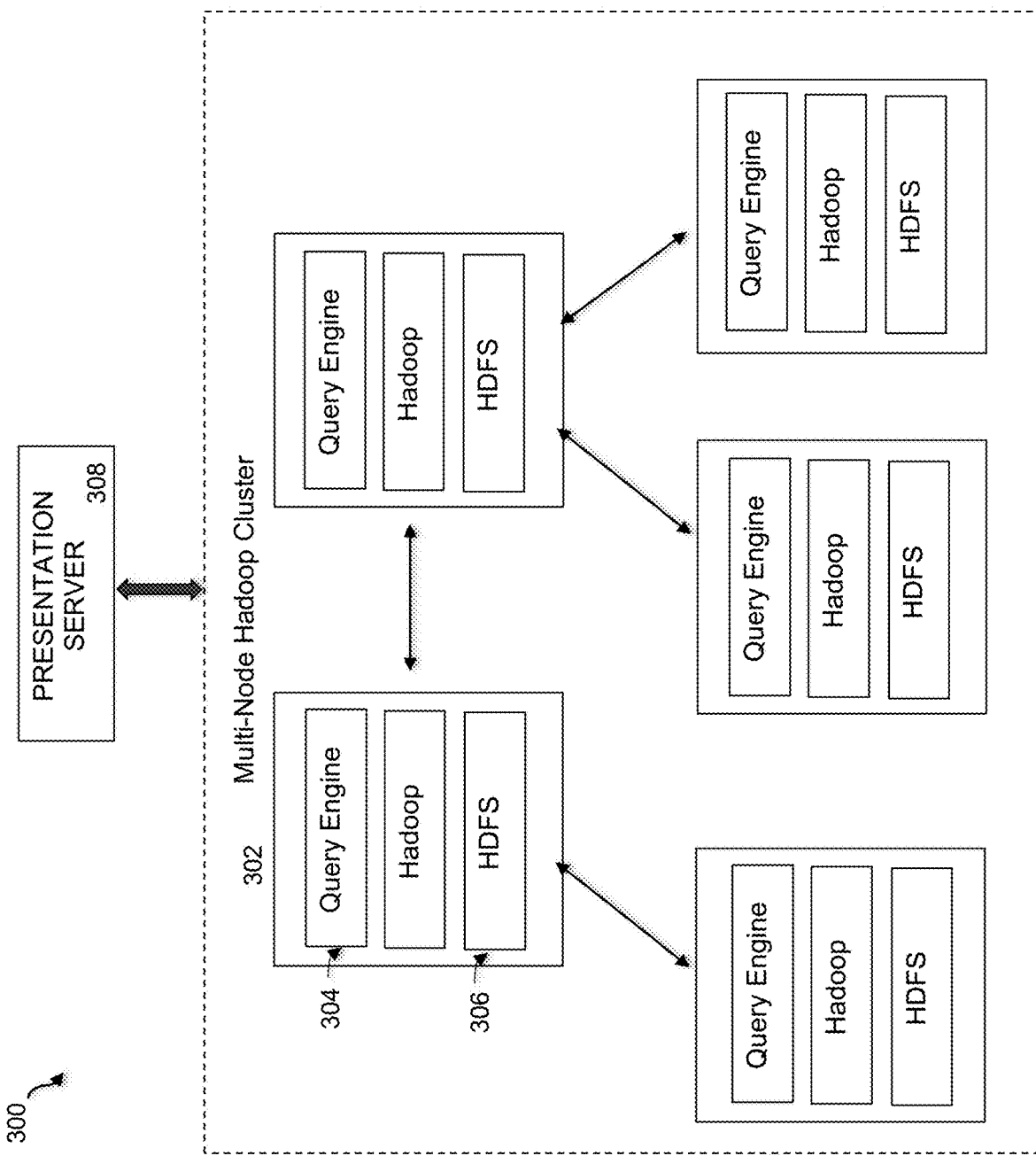
FIG. 3 illustrates a Hadoop multi-node cluster environment that supports certain embodiments of a data management process as described herein.

In an embodiment, systems 100 and 200 process data using the Hadoop collection of software utilities and stored using the Hadoop Distributed File System (HDFS), which is a distributed file system at stores data on commodity machines, providing very high aggregate bandwidth across the cluster. Generally, Hadoop splits files into large blocks and distributes them across nodes in a cluster. It then transfers packaged code into nodes to process the data in parallel. It uses data locality where nodes manipulate the data they access, to allow the dataset to be processed very quickly and efficiently. Diagram 300 of FIG. 3 illustrates a Hadoop multi-node cluster environment that supports certain embodiments described herein. Hadoop runs across multiple nodes, with the nodes typically implemented as either small, low-cost servers or servers running in the network, such as the cloud. The underlying operating system running on the servers is typically Linux. As shown in FIG. 3, each cluster 302 runs a query engine 304 and the HDFS 306.

The Hadoop Distributed File System (HDFS) is a software framework for distributed storage and processing of big data on clusters of machines. The HDFS splits large files into large blocks, such as of size 64 MB or 128 MB, and distributes the blocks among nodes in a cluster. An associated programming model, such as MapReduce can be used to perform data processing, such as filtering and sorting the large data sets in parallel on a cluster. HDFS is structured similarly to a regular Unix filesystem except that data storage is distributed across several machines. It provides a filesystem-like layer for large distributed systems to use. It has built-in mechanisms to handle machine outages, and is optimized for throughput rather than latency. There are three main types of machines in a HDFS cluster: a datanode where HDFS actually stores the data (a cluster has multiple datanodes), a namenode or master machine that controls all the meta data for the cluster, and a secondary namenode that is a separate service that keeps a copy of both the edit logs, and filesystem image, merging them periodically to keep the size reasonable. Data in HDFS can be accessed using either the Java API, or the Hadoop command line client. Many operations are similar to their Unix counterparts.

In general, HDFS has a master/slave architecture. An HDFS cluster consists of a single namenode, a master server that manages the file system namespace and regulates access to files by clients. In addition, there are a number of datanodes, usually one per node in the cluster, which manage storage attached to the nodes that they run on. HDFS exposes a file system namespace and allows user data to be stored in files. Internally, a file is split into one or more blocks and these blocks are stored in a set of datanodes. The namenode executes file system namespace operations like opening, closing, and renaming files and directories. It also determines the mapping of blocks to datanodes. The datanodes are responsible for serving read and write requests from the file system's clients. The datanodes also perform block creation, deletion, and replication upon instruction from the namenode.

HDFS supports a traditional hierarchical file organization. A user or an application can create directories and store files inside these directories. The file system namespace hierarchy is similar to most other existing file systems; one can create and remove files, move a file from one directory to another, or rename a file. HDFS does not yet implement user quotas. HDFS does not support hard links or soft links. However, the HDFS architecture does not preclude implementing these features. The namenode maintains the file system namespace. Any change to the file system namespace or its properties is recorded by the namenode. An application can specify the number of replicas of a file that should be maintained by HDFS. The number of copies of a file is called the replication factor of that file. This information is stored by the namenode.

Although embodiments are described with respect to the Hadoop platform and HDFS data, it should be noted that embodiments are not so limited, and any other distributed file system may be used.

Dataplane Asset Collections

Embodiments include a system and method for managing and governing distributed data assets, including files, tables, in-memory objects, metadata, multi-dimensional data-cubes and governance policies spread across data-centers and clusters, not limited to Hadoop and Hadoop compatible file-systems, under a unified umbrella of "asset collections." Such capability may be provided through a centralized data management process 112 and associated presentation graphical user interface (GUI) component 120 as shown in FIG. 1.

Asset collections allow Hadoop and Hadoop compatible system administrators, to manage and govern various kinds of data objects via a single system through a unified interface, such as presentation server 308 in FIG. 3. This system unifies information for display such as data, metadata such as size/schema/tags/alterations, lineage, and impact on processes and downstream objects in addition to the display of security and governance policies. Furthermore, this system allows the management of the policies, access control and quality information to data stewards as well.

Asset collections integrate with a number of open-source systems (e.g., Ambari, Atlas, Apache Ranger, Apache Knox, and so on) and get detailed information about data-assets such as HDFS Files, Hbase and Hive Tables. These systems capture different pieces of information available through Restful APIs. The dataplane service 201, through its asset collection feature, integrates with all of these systems in unsecured and secure environments and gets all data about such data assets. This data is then available for administrators and data stewards for reference as they use and administer these assets. An administrator can create an asset-collection, and groups different types of assets under it based on certain criteria, such as belonging to a user, similarity of names, customers, date of creation, and so on. Such logical groups of asset collections can come from different data stores, such as HDFS, Hive and HBase. Furthermore, such groups of assets may not be physically located in one cluster or data center but may be spread over multiple data-centers and clusters. The view of the assets inside such collections is all encompassing and presented by presentation server 308 in a "single pane of glass" through GUI 120.

Embodiments of the data management process 112 include a system and method for locating, identifying and categorizing data-assets through advanced machine learning algorithms across Hadoop and Hadoop compatible File Systems, databases and in-memory objects automatically and periodically to provide a visual representation of the category of data assets distributed across data-centers and multiple clusters. Such a system fulfills the purposes of enriching data quality, enabling data discovery and improving outcomes from downstream systems. The integration of systems in HDFS systems across heterogeneous data-asset types, clusters which spans data, metadata and governance policies for purposes of asset understanding and management generally does not currently exist as a product. The illustrated embodiments make big-data management easy and removes the biggest hurdle in big-data operations and management.

In an embodiment, the data discovery operation could include any appropriate business intelligence technology for collecting data from various databases, silos and other data sources in the network. It may also involve consolidating the data into a single source, if necessary. It may also involve processes that detect patterns and outliers in the data through visual navigation techniques or the application of guided analytics. The data discovery process may also include or use data mining processes that are used to discover patterns in large data sets. In general, any knowledge discovery process for databases or data stores may be used for the discovery process.

Figure 4:
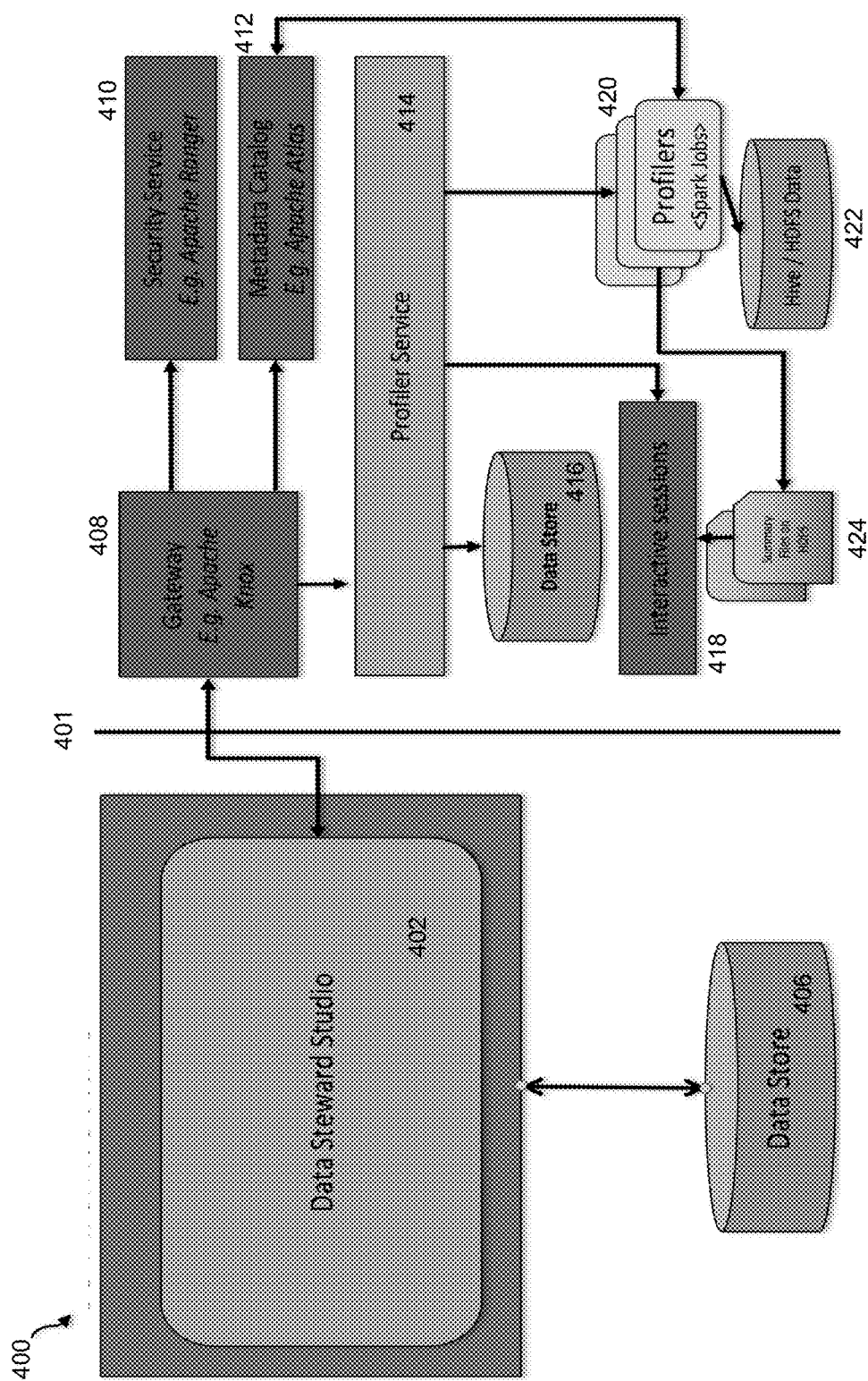
FIG. 4 illustrates a system for managing and governing distributed data assets, under some embodiments.

FIG. 4 illustrates a system for managing and governing distributed data assets, under some embodiments. The overall architecture of system 400 can be divided into two groups relative to demarcation line 401. The group on the left of line 401 and comprising the data steward studio 402 and data store 406 are part of dataplane service 201. The component on the right side of line 401 run inside a data cluster. A key component of system 400 are the dataplane profilers 420 that parse and integrate with different data sources (such as Atlas, Hive MetaStore and Ranger Audits) and perform a classification over an integrated data pool automatically at regular intervals. Any type of statistics can be generated, including: cardinality, non-null count, minimum value, maximum value, mean, median, standard deviation, count of true/false (in case of Boolean), histogram, duplicate values, and others. Additionally content based profilers can categorize data tables and files into various categories such as, identifying information (PII) and other similar standards.

With respect to how the statistics are used to generate data classifications, the statistics and classifications on a particular asset can be aggregated across all assets to produce interesting summaries such as: (a) number of assets containing sensitive information, (b) most frequently occurring sensitivity information, (c) assets with most frequent sensitivity categories, and so on. This can be extended to derive any number of such summarizations by combining the output of these classifications. For instance, combining the statistical information on asset sizes can be used to classify the assets as large, medium or small assets.

In an embodiment, the data steward studio 402 is a web application that provides users an interface through which they can search for assets in their clusters and retrieve different types of information about these assets. The application may be powered by the Play framework and Javascript Angular framework, or similar programs, for the client side interactions. Users can group the assets they discover via the data steward studio 402 into a construct called an "asset collection" which is stored in a data store 406 like a relational database (RDBMS). The asset collection is an organizational construct that the users can use to group assets they would like to access, use, or manage together. For example, an asset collection for customer related information involves all assets related to customer data.

For the right-side components, the gateway 408 is a component through which the data steward studio application can send requests to services running inside a cluster. For a certain data platform, this component's functionality may be served by the Apache Knox product, or any similar product. The security service 410 is a component that exposes APIs for information about policies governing access to the assets in a cluster, audit information about who is accessing which assets, and so on. For a certain data platform, this component's functionality may be served by the Apache Ranger product, or any similar product. The metadata catalog 412 is a component that holds the metadata information about assets that need to be discovered and managed inside the data steward studio 402. This information can have metadata properties, such as: the owner of the asset, when it was created or updated, where it is located, its schema (in case of structured assets like Hive tables), and so on. This catalog component exposes this information through APIs for search and retrieval of one or more assets.

For a certain data platform, this component's functionality may be served by the Apache Atlas project, or any similar product.

In an embodiment, the profilers 420 are jobs written using Apache Spark or similar processing frameworks that determine relevant properties about assets. Each profiler job runs on one or more assets at a time. A number of profilers can be written, where each profiler can focus on extracting one kind of information. Assets can be any source of information like data tables 422 in Apache Hive, files in Apache HDFS, audit logs from Apache Ranger, and so on. Typically, these are read using the APIs of a Hadoop Compatible File System API. Information from profilers can be persisted as metadata extensions in the metadata catalog 412 or into summary files on HDFS 424. The summary information can be served as metrics around metadata properties. The interactive sessions 418 are processes that read the summary files 424 on HDFS and serve the data in these files in real time to requestors.

The profiler service 414 is a web service that performs several important functions: (1) it allows different 'profilers' to be registered, enabled, configured and managed; (2) it schedules profiler instances to be launched against groups of assets so that interesting properties of the assets can be periodically collected by the profilers; (3) it plays a role of detecting changes in the assets so that it can optimize which assets should be profiled freshly; (4) it manages the profiler jobs by monitoring and recording their status; and (5) it exposes APIs for querying some summaries of profiled data interactively.

The data store 416 on the profiler service side stores information about the profilers 420 that are registered, the assets added to be profiled, and other metadata information necessary for the working of the profiler service. In the analogy of an information retrieval system, the profiler service can be considered as a 'crawler' of information and the profilers as an 'indexer' of information.

With respect to the metadata information that is used to register the profilers, when a profiler a registered, the following information is defined: (a) the name of the profiler, (b) its version, (c) the location on HDFS where the compiled binaries of the profiler are available for execution, (d) the asset source which the profiler is responsible for profiling (e.g. Hive tables), (e) the default schedule at which the profiler information might need to be refreshed and so on. This information is stored by the profiler service 414 into the data store 416 and used in controlling the launch of the profilers 420. Apart from this metadata, the profiler service does not need to know any more details about the operation of any one profiler. From this, it can be seen how a new profiler can be created by registering one with the service. The kinds of information each profiler generates can be classified into two major types: (a) information to extend the metadata for a given asset (b) summarization of such information across multiple assets. Examples of the former include the statistical properties of the asset and its sensitivity information. Examples of the latter include the aggregations on the sensitivity information such as the number of assets containing sensitivity information. Profilers 420 write the metadata extensions directly to a metadata catalog 412. By virtue of this, applications such as the data steward studio 402 can query the metadata catalog to retrieve this additional information along with existing metadata about the asset already captured by the system. The profilers store summarization across assets inside summary files on HDFS 424. The format of the files are such that the profiler service can use interactive query sessions 418 to load and run queries on these summarizations dynamically. A specific example is the case when the summary files contain information about every tabular asset, its column and the list of sensitivity classifications for that column. A standard SQL query can be written to generate the list of tables containing the highest number of sensitive columns. Another example is the most frequently occurring sensitive classifications. By storing the summary files at an appropriate level of granularity, the system can be extended to generate any number of summarizations as deemed useful for Data Stewards.

Figure 5:
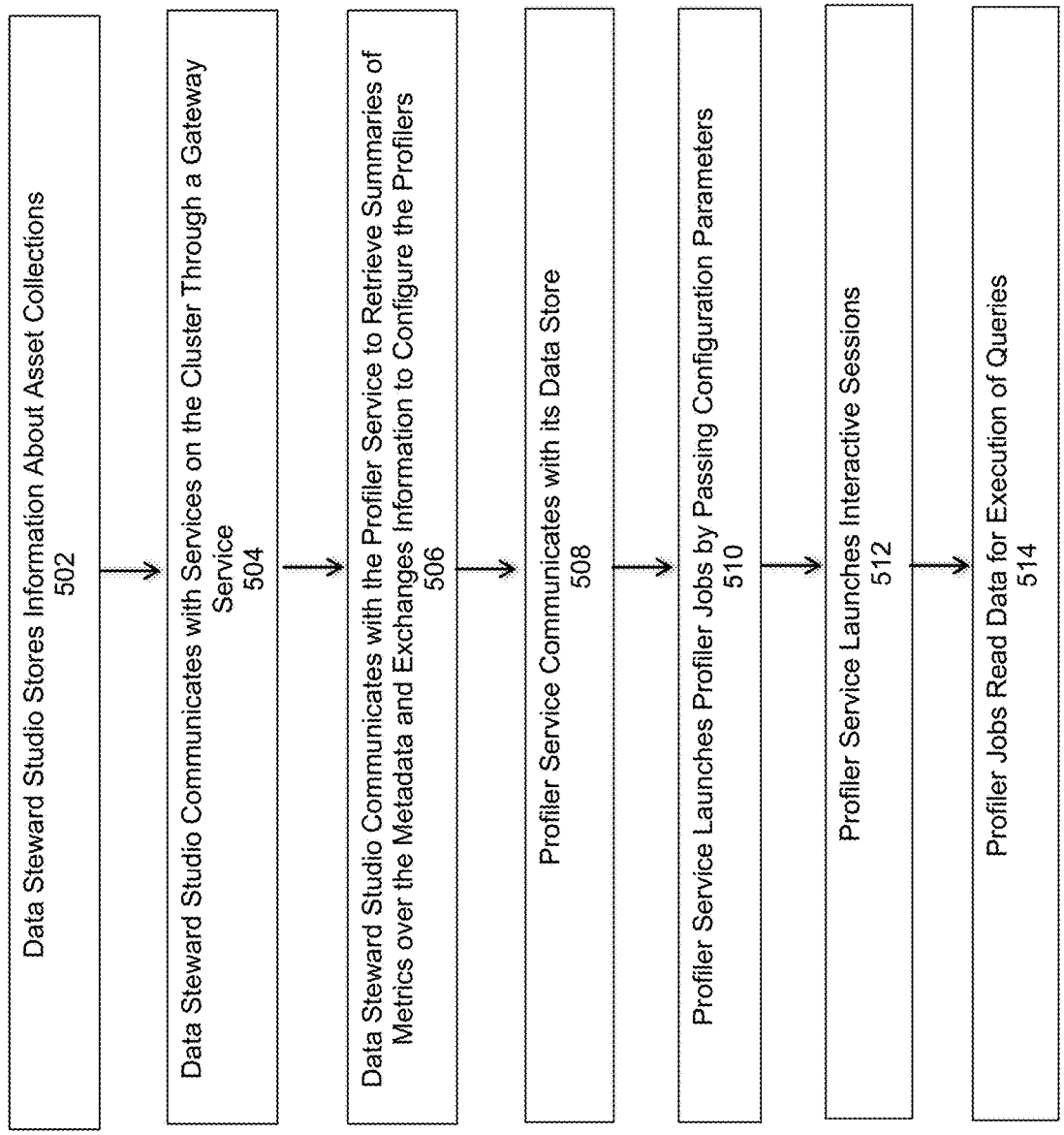
FIG. 5 is a flowchart illustrating interactions between the various sub-systems of system 400 of FIG. 4, under some embodiments.

FIG. 5 is a flowchart illustrating interactions between the various sub-systems of system 400 of FIG. 4, under some embodiments. As shown in FIG. 5, the data steward studio application 402 stores information about the asset collections in data store 406 (e.g., Postgres) of the cluster, step 502. It communicates using standard JDBC protocols using the appropriate flavor of the data store. The data steward studio also communicates with services on the cluster via a gateway service 408 that provides single sign-on capabilities, step 504. The protocols used may be RESTful API calls over HTTPS. The specific data it exchanges with the security service 410 is information about the policies about assets, or audit log information. This information is expected to be provided by the service using RESTful APIs over HTTPS. Likewise, the specific data it exchanges with the metadata catalog service 412 is metadata information about the assets that are stored in the cluster. Again, this information is expected to be provided over a RESTful API over HTTPs. The application also communicates with the profiler service 414 to retrieve summaries of metrics over the metadata, step 506. It also exchanges information required to configure the profilers. This information is passed using a RESTful API exposed by the Profiler Service over HTTPs.

For its part, the profiler service 414 communicates with its data store 416 using standard JDBC protocols using the appropriate flavor of the data store, step 508. The profiler Service launches profiler jobs 420 by passing them configuration parameters related to the execution engine like Spark, step 510. These parameters could be related to the Spark executor memory, driver memory, number of cores for executors or drivers, and so on. In addition, the profiler service also passes information to these jobs about which list of assets should be profiled. These jobs are usually launched using a service that provides a RESTful interface like the Apache Livy service, or any similar service. The profiler service then launches interactive sessions of Spark in the same way the jobs are launched, step 512. These are launched at the start of the profiler service and are managed by the service throughout its lifetime. The service then communicates via the sessions to load the summarized files and serve the interactive metrics. Next, the profiler jobs read data from Hive using the SparkSQL interface, step 514. Through this interface these jobs can execute any SQL queries on Apache Hive data. They use these queries to generate statistical summaries, or to detect sensitive content. They read or write files on HDFS using the standard HDFS compatible file system protocol, which is a binary RPC protocol.

Figure 6:
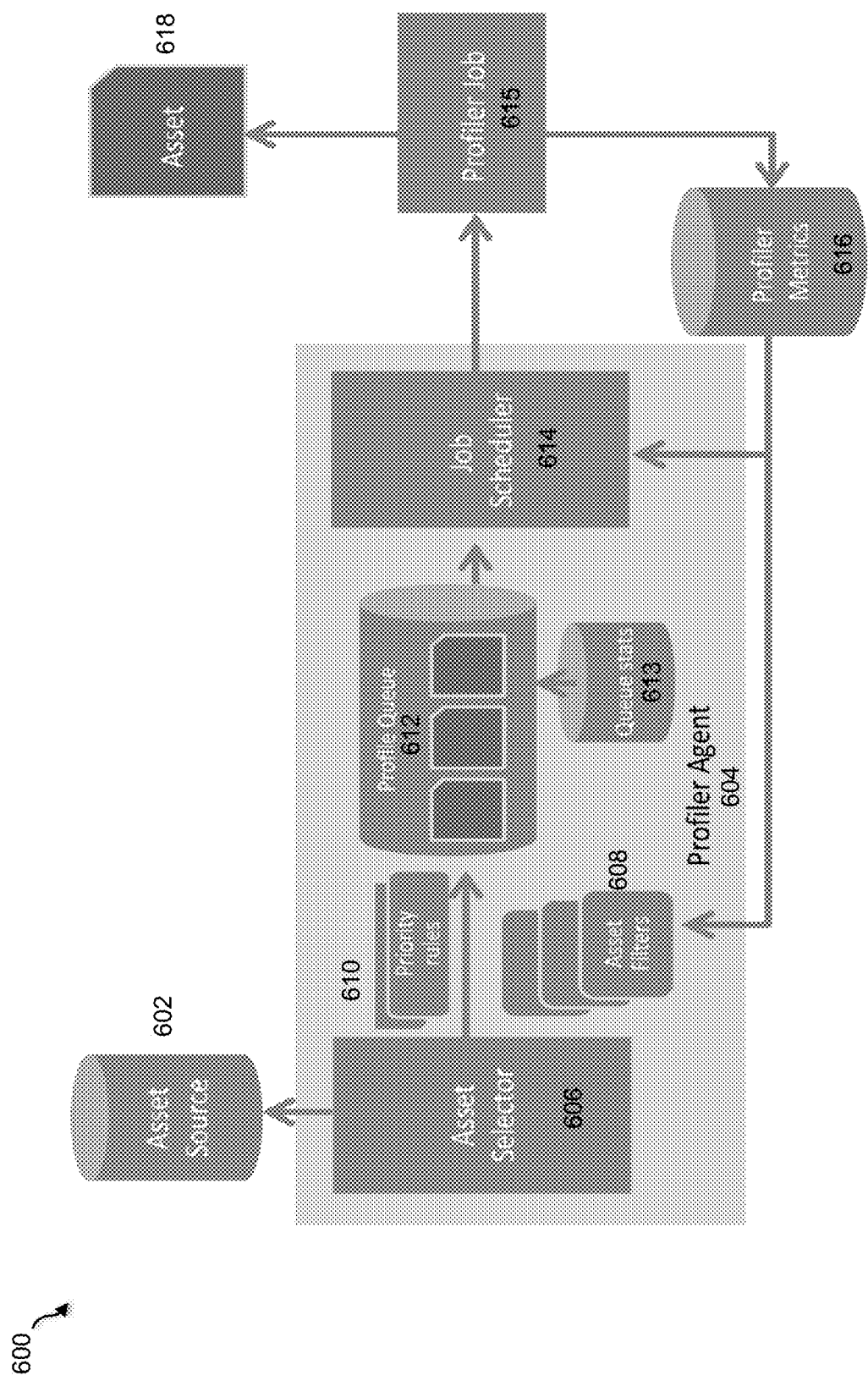
FIG. 6 is a block diagram showing the elements of the profiler service of FIG. 4 in greater detail.

As shown in FIG. 4, a key component of system 400 is the profiler service 414. FIG. 6 is a block diagram showing the elements of the profiler service of FIG. 4 in greater detail. As shown in system 600, the profiler service comprises several different components.

For system 600, the asset source 602 is a source of metadata information about assets like the Hive metastore, which is a source of Hive table information, and HDFS is a source of file/directory information. Within profiler agent 604, the asset selector 606 periodically (per a defined time schedule) looks for changes in the asset source to determine which assets have been added, removed or updated. The list of assets detected here are considered for profiling to refresh information. Asset filters 608 are functions that decide whether a given asset should be submitted for profiling based on the current state of the system. They help to selectivity about the assets to be profiled at any given time, reducing unnecessary profiling. Asset filters can be generic or specific to a certain profiler. The priority rules 610 tell how a list of assets should be ordered for profiling. This ordering helps to ensure that the systems gives a chance to profilers to profile assets in an order that would help users to get information about assets they care about. Some examples of priority rules are: recency (e.g., assets that have been created more recently can be prioritized first); freshness (e.g., assets that have changed recently can be prioritized first; and fairness (e.g., ensure all assets get a chance to be profiled and hence, bump up priority based on how long an asset has been waiting to be profiled). Another priority rule may be importance of an asset, in that assets that are important to users can be prioritized first, where importance can be either explicitly specified by users, or implicitly derived by the system based on other signals. Such signals could be based on access pattern, user engagement (e.g., likes, bookmarks, favorite lists from asset collections, etc.). Event searches for specific assets can be captured and used for this purpose).

The profile (or priority) queue 612 is a component that stores assets to be picked for profiling. The entries in this queue would be maintained in priority order. There can be one queue per profiler, as each profiler could potentially select a different set of assets 618 or would finish profiling assets in different orders of time. Certain queue statistics 613 may be compiled for the profile queue to monitor system performance.

The job scheduler component 614 looks at the profiler queue 612 at a system specified periodicity and picks up assets to be scheduled for profiling. The job scheduler is also responsible for some certain functions, such as: (1) it could batch assets together and submit them to a single profiling job 615, which can be used to avoid the overhead of launching a large number of jobs; (2) it could ensure that it imposes some constraints on resources used by profiling jobs; (3) it could be configured to submit jobs to fixed set of queues; and (4) it could stop submitting jobs based on different criteria, such as: not having more than a system configured number of active profiling jobs/assets, and not submitting jobs if the execution engine is not healthy (like many profiling jobs failing, etc.).

In order to assist asset filters 608 and job scheduler 614 to make data driven choices, it is important that metrics are collected by the system. Thus, profiler metrics 616 represents these metrics. Likewise, the profiler metrics can also be used to bring visibility into the system performance and help fine tune certain processing algorithms.

Figure 7:
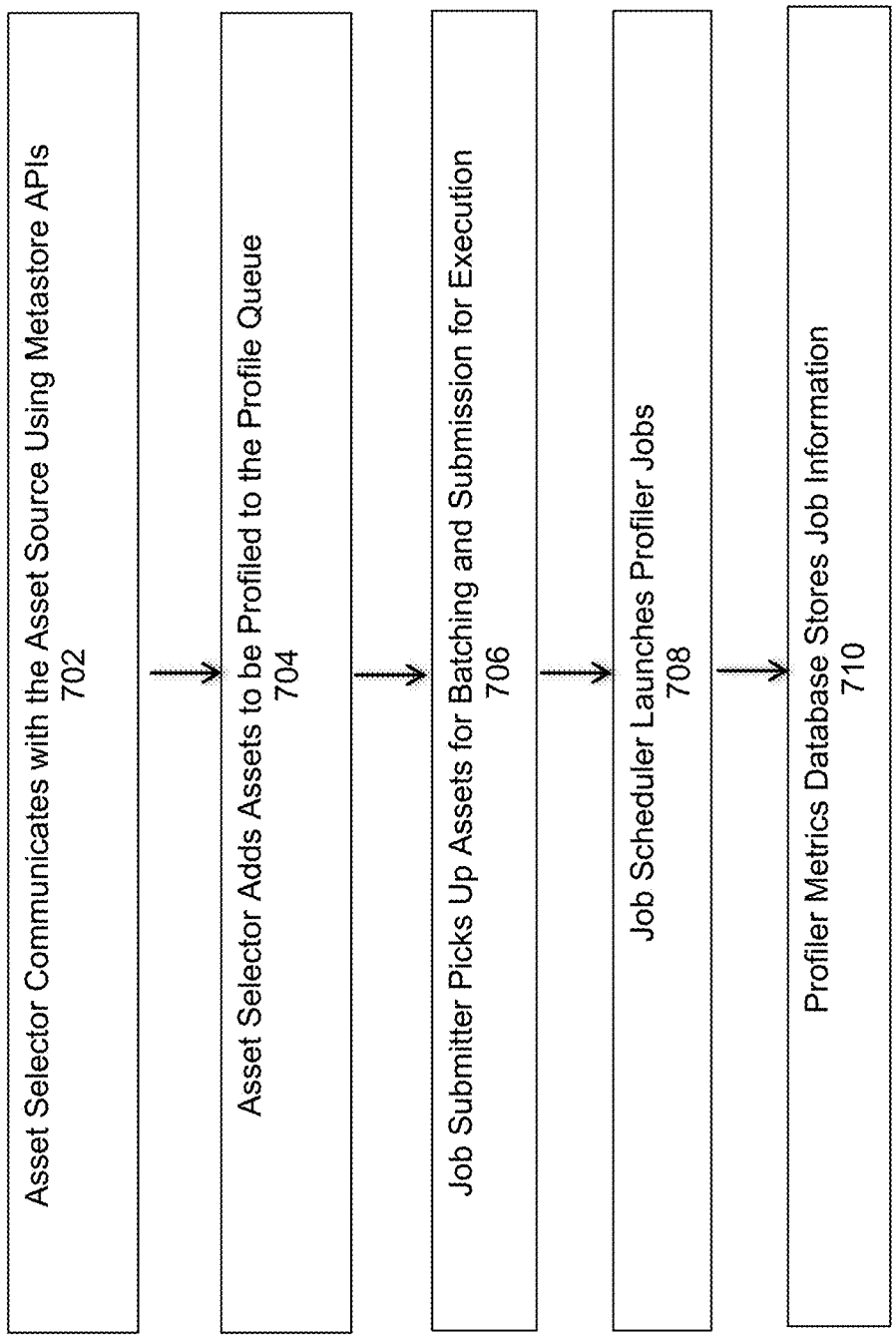
FIG. 7 is a flowchart illustrating interactions between the various sub-systems of system 600 of FIG. 6, under some embodiments.

FIG. 7 is a flowchart illustrating interactions between the various sub-systems of system 600 of FIG. 6, under some embodiments. The asset selector 606 first communicates with the asset source 602 (e.g., Hive asset source) using the Hive Metastore APIs, step 702. The selector communicates with the HDFS asset source using the standard HDFS compatible file system protocol, which is a binary RPC protocol. These APIs provide information about metadata of assets that need to be profiled. All information exchange within the profiler agent 604 happens in-process using method calls. The asset selector adds assets to be profiled to the profile queue 612, which maintains these in an order sorted by some business decisions, step 704. These assets are picked up by a job submitter for batching and submitting them for execution, step 706. Next, the job scheduler 614 launches profiler jobs 615 as described above, step 708. The profiler job profiles an asset, which is either a Hive Table or HDFS files using the same methods described above. As also described above, the profiler metrics database 161 stores information like profiler job launch times, run times, and so on, step 710. These are collected by monitoring status of the jobs launched via standard Apache Spark interfaces and populated into an RDBMS data store. The asset filters and job scheduler reads this information using standard JDBC protocols depending on the flavor of the database used.

In an embodiment, the data steward studio 402, profiler service 414, profilers 420 and interactive sessions 418 are implemented as part of the data management process 112. The remaining components of system 400 may be open source components that are connected to for information, though embodiments are not so limited. For this embodiment, the dataplane profilers 420 integrate with various open source systems such as Apache Atlas and Apache Ranger, and parse data from multiple sources such as Hive metastore, Ranger audit logs on HDFS Files and Atlas Lineage data store, and applies machine learning (ML) algorithms to generate univariate statistics for Hive tables, and aggregations and summarizations from other data sources. This data is then persisted into the source systems for univariate statistics generated into the Atlas Database and into an HDFS based highly compressed extensible data-warehouse with a SQL interface for querying and persistence. The SQL interface and the profiler architecture is highly extensible and can support ad-hoc queries that users and administrators may present to the system. As described above, the following are some of the data fields generated: cardinality, non-null count, min value, max value, mean, median, standard deviation, count of true/false (in case of boolean), Histogram. In addition, this system allows stewards and administrators to answer questions such as: the identity of top users in the cluster, access pattern split, select/update, top 10 tables used, unauthorized access, tables not accessed/used during intervals, frequent schema modifications, top queries, and so on.

Figure 8:
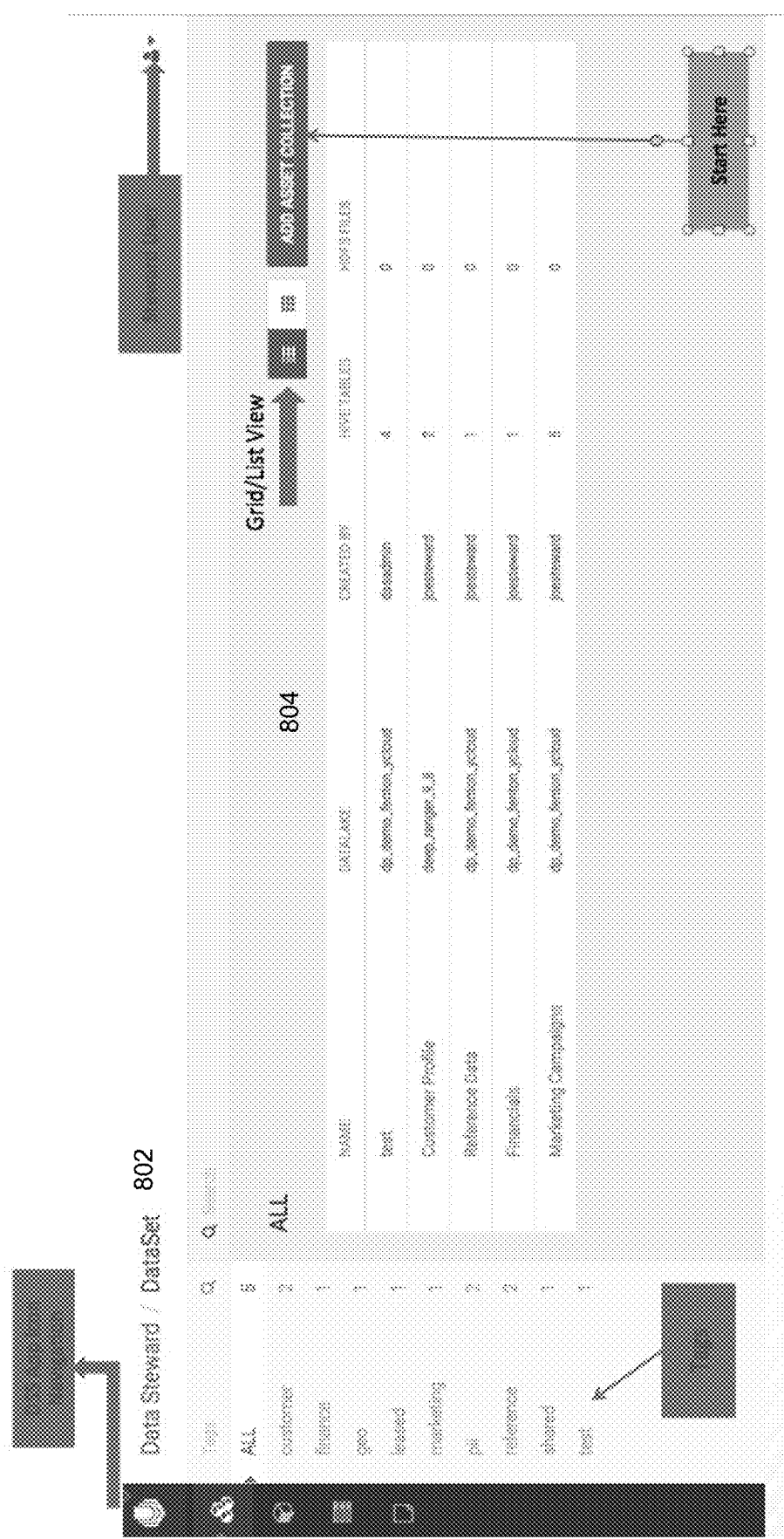
FIG. 8 illustrates an example GUI display screen illustrating a user interface portal to the data management process 112.

The various data statistics and properties may be presented to the user through a GUI component 120 and/or a presentation server 308 for a multi-node Hadoop cluster, such as shown in FIG. 3. FIG. 8 illustrates an example GUI display screen illustrating a user interface portal to the data management process 112. As shown in FIG. 8, various display fields for the data steward and datasets can be displayed, and relevant data such as name, source (data lake), creator, location, and so on can be displayed in a central display area 804 in grid or list view, or other appropriate manner. The GUI display 800 of FIG. 8 is provided as an example for illustrative purposes only, and any other appropriate format and content is possible depending on system and user preferences, requirements, and so on.

Figure 9:
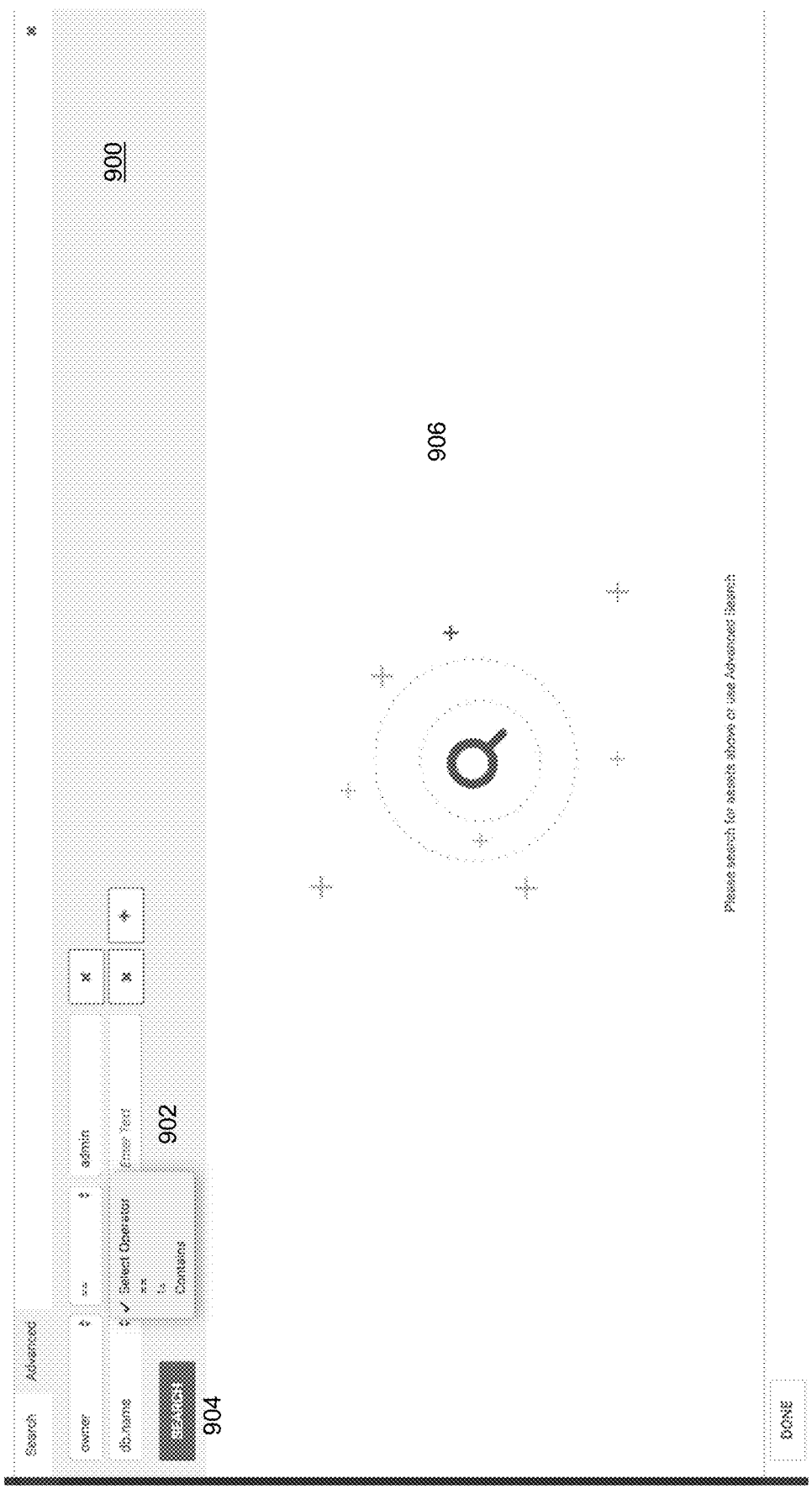
FIG. 9 illustrates an example GUI display screen for a query page to create an asset collection, under some embodiments.

FIG. 9 is an example GUI display for a query page to create an asset collection, under some embodiments. An asset collection can be built by the data steward by querying for assets using their metadata properties from the metadata catalog 412. It should be noted that the metadata properties presented here can include those properties that are extended by the profilers 420. Each asset in an asset collection is represented using a special page called the "Asset 360" page. The Asset 360 page, as the name suggests, includes all possible details about the asset fetched from the security service, the metadata catalog and the summary files on HDFS. For the example of FIG. 9, display page 900 includes the metadata input area 902 where the data steward enters the appropriate metadata search terms prior to activating the search command 904. The assets are then displayed in the main display area 906. FIG. 9 illustrates an idle display area 906 prior to display of search results.

Figure 10:
FIG. 10 illustrates an example GUI display screen for an Asset 360 view for an asset displaying statistical properties from profilers, under some embodiments.

FIG. 10 illustrates an example GUI display screen for an Asset 360 view for an asset displaying statistical properties from profilers, under some embodiments. FIG. 10 shows an illustrative example of a part of the Asset 360 page 1060 that displays the statistical summaries generated by profilers 420. Various details 1062 can be provided for the assets, and the statistical summaries can be displayed as tabular and graphical schema, as shown in display area 1064. Such a display may be accessed under the "Details" section of main page 1060.

Figure 11:
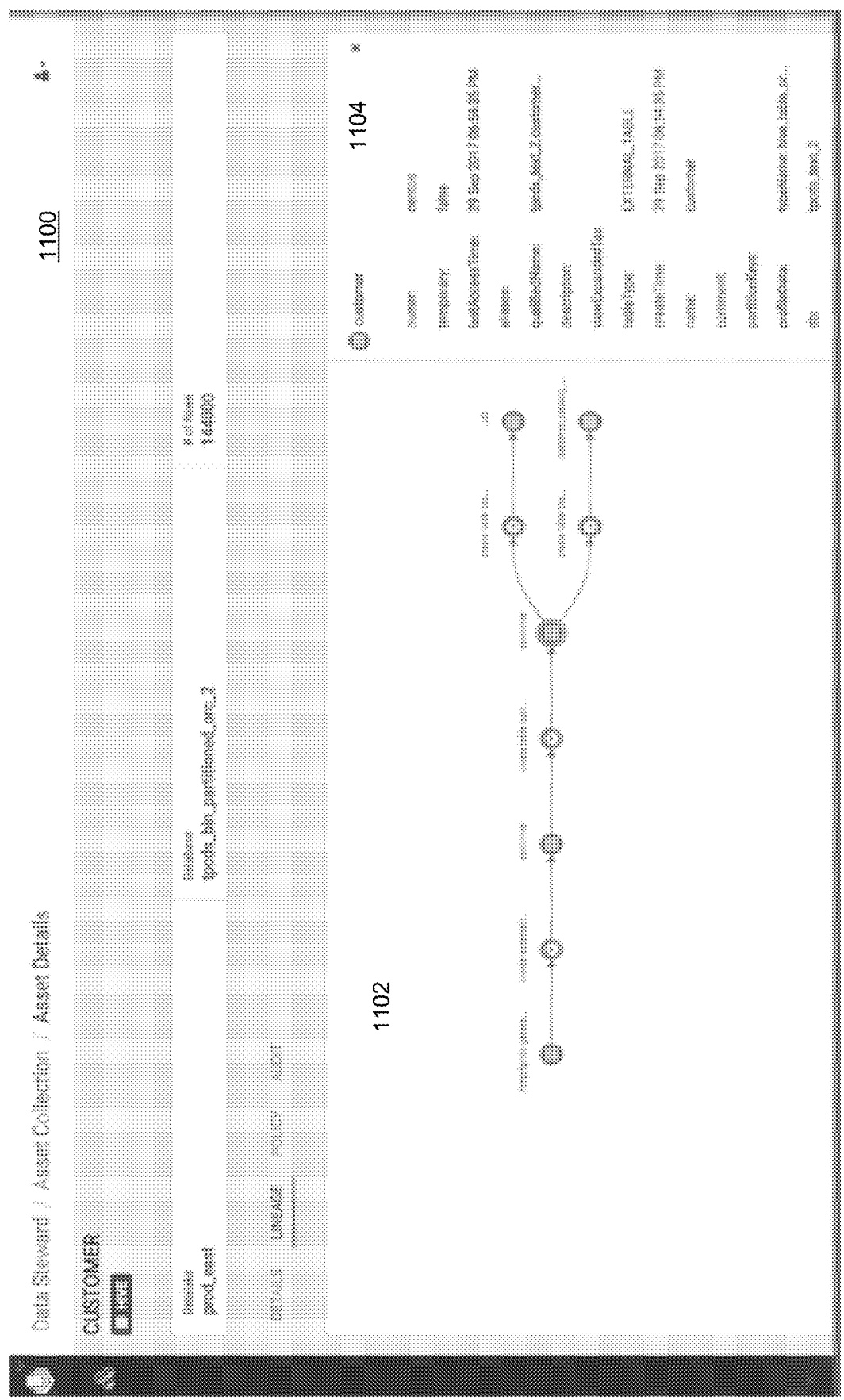
FIG. 11 illustrates an example GUI display screen for an Asset 360 view for an asset displaying lineage information fetched from a metadata catalog, under some embodiments.

FIG. 11 illustrates an example GUI display screen for an Asset 360 view for an asset displaying lineage information, under some embodiments. As shown in FIG. 11, different metadata properties fetched from a metadata catalog are displayed in linear form. Such a display may be accessed under the "Lineage" section of main page 1060. Certain details about specific properties may be further displayed in display area 1104.

Figure 12:
FIG. 12 illustrates an example GUI display screen for an Asset 360 view of all applicable security policies, under some embodiments.

FIG. 12 illustrates an example GUI display screen for an Asset 360 view of all applicable security policies, under some embodiments. Display page 1200 of FIG. 12 shows the applicable security and governance policies for data fetched from a security service. Display area 1202 displays resource based policies and display area 1204 displays tag based policies. Such a display may be accessed under the "Policy" section of main page 1060.

It should be noted that the specific layouts and example content shown in the web example page displays of FIGS. 8 to 12 are provided for purposes of illustration only, and any other layout, configuration, data representation may be provided or implemented.

The methods and systems described herein make automatic machine learning based classification of various kinds of data readily available without the data steward needing to apply rules or write complicated scripts to generate such data. In contrast with the described embodiments, present rule-based systems fall short because of the rigidity of rules as the nature of data changes with time. Lack of visibility of the nature of data in the data infrastructure poses severe risks to business which are solved with the described profiler framework.

Figure 13:
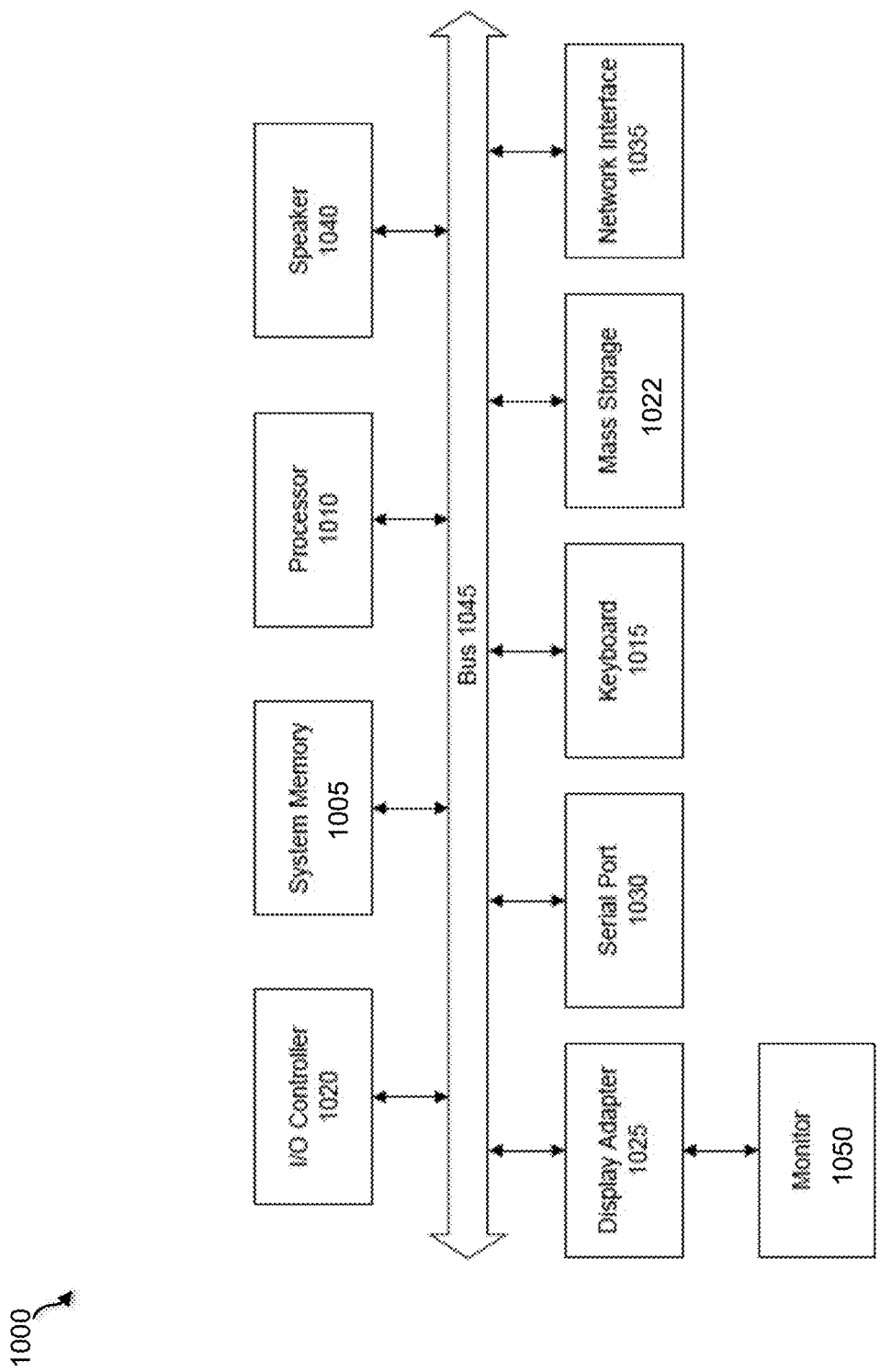
FIG. 13 is a block diagram of a computer system used to execute one or more software components of a Hadoop data management system, under some embodiments.

The network environments of FIGS. 1 and 2 may comprise any number of individual client-server networks coupled over the Internet or similar large-scale network or portion thereof. Each node in the network(s) comprises a computing device capable of executing software code to perform the processing steps described herein. FIG. 13 is a block diagram of a computer system used to execute one or more software components of a data management process for Hadoop clusters, under some embodiments. The computer system 1000 includes a monitor 1050, keyboard 1015, and mass storage devices 1022. Computer system 1000 further includes subsystems such as central processor 1010, system memory 1005, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 13 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

Embodiments may be applied to data, storage, industrial networks, and the like, in any scale of physical, virtual or hybrid physical/virtual network, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of managing data in a hybrid network containing cloud networks and one or more local or wide area networks, comprising:
   discovering data stored in disparate sources including cloud-based storage, network storage, and local device storage across the network to form disparate data that presents an arbitrary schema to a user, wherein the network comprises a plurality of multi-node clusters implementing a Hadoop Distributed File System (HDFS) operating in a Hadoop infrastructure running on the network and organizing the disparate data;
   grouping the data into an asset collection comprising individual data elements grouped into respective data assets comprising a source of information including data tables, files in the HDFS, and security service audit logs;
   launching, from a profiler service, a respective profiler job, among a plurality of profilers, against each data asset, wherein each profiler job is configured to extract certain information from its respective data asset, wherein each profiler extracts one kind of information from the data assets, and wherein the profiler service configures and manages the profilers, schedule launching of the profilers, and monitoring a status of each profiler and wherein the profiler service and profilers run within a cluster of the multi-node clusters and interface with a data steward process executed within a dataplane service comprising data applications that manage data across the hybrid network;
   providing, by the dataplane service, a user interface facilitating searches of different types of information about the data assets from the profilers; and
   classifying the data into defined classes based on the extracted information of each profiler job.

2. The method of claim 1 wherein the data is classified based on statistics generated by the profilers, comprising: cardinality, non-null count, minimum value, maximum value, mean, median, standard deviation, count of true/false, histogram, and duplicate values.

3. The method of claim 1 further comprising:
   registering each profiler job in the profiler service;
   scheduling profiler instances to be launched against groups of data assets on a defined periodic basis to regularly collect relevant information regarding the data assets;
   monitoring the profiler jobs to derive respective profiler job status; and
   recording the respective status of the profiler jobs for storage in a data store.

4. The method of claim 1 wherein the extracted information is persisted as metadata extensions associated with corresponding data elements of the data assets.

5. The method of claim 4 wherein the metadata extensions are stored in one of a metadata catalog or summary files in a distributed file system implemented on the network across all of the data assets.

6. The method of claim 5 further comprising processing the metadata extensions through one or more analysis processes to derive metrics of the data assets.

7. The method of claim 5 further comprising displaying, through a graphical user interface of a client computer coupled to the network, the metrics of the data assets for review and analysis by a user of the client computer.

8. The method of claim 3 wherein the profiler service is configured to:
   detect changes in the data assets; and
   optimize which data assets should be profiled first relative to other data assets based on the detected changes.

9. The method of claim 8 further comprising implementing priority rules against the data assets to establish an order of profiling.

10. The method of claim 9 wherein the priority rules comprise at least one of the following: recency of asset creation, freshness of asset change, fairness across all assets, and relative importance of asset as determined by one of access patterns and user engagement of the asset, the method further comprising queueing the respective data assets in a priority queue for profiling based on the applied priority rules.

11. A system for managing data in a hybrid network containing cloud networks and one or more local or wide area networks, comprising:
   a hardware processing component discovering data stored in disparate sources including cloud-based storage, network storage, and local device storage across the network to form disparate data that presents an arbitrary schema to a user, and wherein the network comprises a plurality of multi-node clusters implementing a Hadoop Distributed File System (HDFS) organizing the disparate data and operating in a Hadoop infrastructure running on the network;
   a grouper component of the hardware processing component grouping the data into an asset collection comprising individual data elements grouped into respective data assets comprising a source of information including data tables, files in the HDFS, and security service audit logs;

a profiler service component, coupled to the grouper component, launching a respective profiler job, from among a plurality of profilers, against each data asset, wherein each profiler job is configured to extract certain information from its respective data asset, wherein each profiler extracts one kind of information from the data assets, and wherein the profiler service configures and manages the profilers, schedule launching of the profilers, and monitoring a status of each profiler, and wherein the profiler service and profilers run within a cluster of the multi-node clusters and interface with a data steward process executed within a dataplane service that provides a user interface facilitating searches of different types of information about the data assets from the profilers, and further wherein the dataplane service comprises data applications that manage data across the hybrid network; and a classifier, coupled to the profiler component, classifying the data into defined classes based on the extracted information of each profiler job.

12. The system of claim 11 further comprising:

a scheduler registering each profiler job in a profiler service and scheduling profiler instances to be launched against groups of data assets on a defined periodic basis to regularly collect relevant information regarding the data assets; and a monitor monitoring the profiler jobs to derive respective profiler job status, and recording the respective status of the profiler jobs for storage in a data store.

13. The system of claim 11 wherein the extracted information is persisted as metadata extensions associated with corresponding data elements of the data assets, and wherein the metadata extensions are stored in one of a metadata catalog or summary files in a distributed file system implemented on the network across all of the data assets.

14. The system of claim 1 further comprising:

an analytics component processing the metadata extensions through one or more analysis processes to derive metrics of the data assets; and a graphical user interface of a client computer coupled to the network, displaying the metrics of the data assets for review and analysis by a user of the client computer.

15. A non-transitory computer readable storage medium storing program instructions, which when executed by a processor, cause a computer to perform a method of managing data in a network hybrid network containing cloud networks and one or more local or wide area networks, comprising:

discovering data stored in disparate sources including cloud-based storage, network storage, and local device storage across the network to form disparate data that presents an arbitrary schema to a user, wherein the network comprises a plurality of multi-node clusters implementing a Hadoop Distributed File System (HDFS) operating in a Hadoop infrastructure running on the network and organizing the disparate data;

grouping the data into an asset collection comprising individual data elements grouped into respective data assets comprising a source of information including data tables, files in the HDFS, and security service audit logs;

launching, from a profiler service, a respective profiler job, among a plurality of profilers, against each data asset, wherein each profiler job is configured to extract certain information from its respective data asset, wherein each profiler extracts one kind of information from the data assets, and wherein the profiler service configures and manages the profilers, schedule launching of the profilers, and monitoring a status of each profiler and wherein the profiler service and profilers run within a cluster of the multi-node clusters and interface with a data steward process executed within a dataplane service comprising data applications that manage data across the hybrid network;

providing, by the dataplane service, a user interface facilitating searches of different types of information about the data assets from the profilers; and classifying the data into defined classes based on the extracted information of each profiler job.

* * * * *